Feb. 2, 1965   C. G. FLEURY   3,167,920
ARRANGEMENT FOR CONTROLLING THE MOVEMENT
OF A MACHINE PART
Filed May 3, 1963

United States Patent Office 3,167,920
Patented Feb. 2, 1965

3,167,920
ARRANGEMENT FOR CONTROLLING THE MOVEMENT OF A MACHINE PART
Claude G. Fleury, 2125 Fruitville Pike, Lancaster, Pa.
Filed May 3, 1963, Ser. No. 277,843
Claims priority, application Switzerland, May 29, 1962,
6,521/62
5 Claims. (Cl. 60—54.5)

My invention has for its object an arrangement for controlling the movement of a machine part, which arrangement includes at least two cylinders in each of which slides a piston, said cylinders being interconnected, on the one hand, through at least one passageway controlled by a valve closing after a predetermined stroke of at least the first of said pistons and, on the other hand, through at least one passageway, the cross-section of which is much smaller than that closed by said valve, while the first of said pistons is mechanically connected with said machine part and the second piston is adapted to be subjected to the action of a compressed fluid admitted in that chamber, of two chambers defined by said second piston, which is not connected with the second cylinder. The chambers of the two cylinders which are connected through said passageways are entirely filled with a second fluid, the whole arrangement being designed in a manner such that, when said second piston is subjected to the action of the first-mentioned compressed fluid, it drives the second fluid out of its cylinder into the cylinder containing the first piston through said valve as long as the latter remains open, so as to make said first piston move at a high speed, together with the part controlled thereby, while said first piston is driven at a much lower speed when said valve is closed, the second fluid being then urged into the corresponding cylinder through the narrower passageway.

I have illustrated, by way of example, in the accompanying drawings, a preferred embodiment of the object of my invention. In said drawings.

Figure 1:
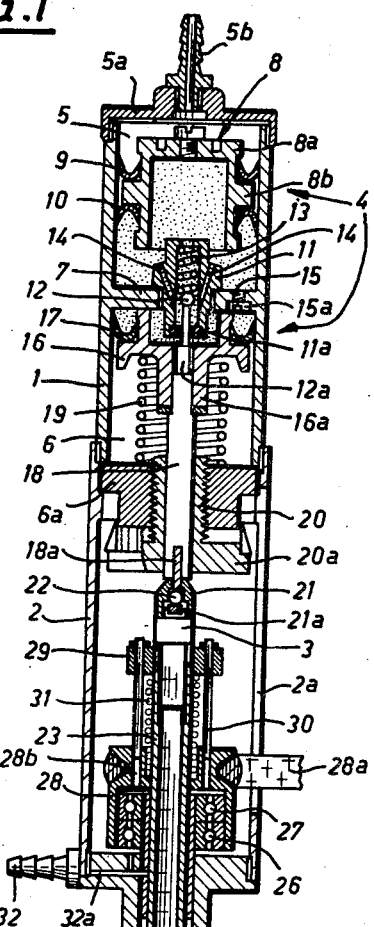
FIG. 1 is a longitudinal cross-section of the headstock of a machine-tool equipped with an arrangement according to my invention.

As illustrated, the headstock includes two tubular casings 1 and 2 secured endwise, the latter of which carries axially a rotary spindle 3 adapted to be shifted longitudinally by a control system 4 carried inside the sleeve 1. The latter is subdivided into two cylinders 5 and 6 by an intermediate partition 7, said cylinders 5 and 6 being closed respectively by a terminal wall 5a and by a wall 6a extending inside the sleeve 2.

Inside the cylinder 5 is housed a piston 8 constituted by a socket 8a provided at mid-height with an outer collar 8b. Between said socket and the inner surface of the cylinder are fitted two annular packings 9 and 10 extending over the opposite sides of said collar. The terminal wall 5a closing the cylinder 5 is provided with a connecting nozzle 5b opening into a pipe feeding fluid under pressure, for instance compressed air or oil, which fluid, when it is fed into the cylinder urges the piston in the direction facing the cylinder 6. The opening of the socket 8a faces the partition 7.

Said intermediate partition 7 is provided with a valve system constituted by a cylindrical sleeve 11 passing through it and extending into both cylinders 5 and 6, said sleeve carrying a ball 12 acting as a closing member and urged against an annular seat 11a by a spring 13; 14 designates further auxiliary channels for the fluid. Said ball 12 is provided with a projection 12a adapted to extend through the seat 11a and the part played by which will be disclosed hereinafter. The partition 7 is also provided with a further passageway or opening 15 adapted to be more or less closed through action on an adjusting screw 15a.

Inside the cylinder 6 is housed a piston 16 fluid tightly fitted in an annular packing 17 and provided with a section of a reduced diameter 16a to which is secured a rod 18. A spring 19 is held in a tensioned condition between said piston and the wall 6a. When the piston 16 is in the position illustrated, the projection 12a on the ball 12 is in contact with the end of said rod and said ball is therefore lifted off its seat 11a. The rod 18 is furthermore removably fitted in a sleeve 20 extending over a length exceeding the thickness of the wall 6a inside which it is screwed. Said sleeve is, in fact threaded along its outer surface and its axial position with reference to the wall 6a may be adjusted by screwing it down to a varying extent inside said wall as provided by acting on a cap 20a forming a control knob and the outer surface of which carries a scale of subdivisions corresponding to the progression by successive amounts of 0.1 mm. The different positions which said sleeve 20 may thus assume with reference to the corresponding piston 16 correspond in practice to different possible lengths of stroke of said piston and consequently of the spindle 3 as disclosed hereinafter.

The space extending between the pistons 8 and 16 is filled with a fluid, preferably a liquid, such as oil, so as to form a non-compressible cushion. Thus, when compressed air is fed into the nozzle 5b of the cylinder and causes the piston 8 to move in the direction of the partition 7, said piston urges the oil contained in the cylinder 5 towards the cylinder 8. Said oil passes through the sleeve 11 as long as the ball 12 does not engage its seat 11a under the action of the spring 13, that is during a predetermined fraction of the stroke of the piston 16. When the sleeve 11 is closed by the ball 12, the oil continues passing through the opening 15. Said flow of oil out of the cylinder 5 into the cylinder 6 stops when the restricted section 16a of the piston 16 engages the sleeve 20 thereby stopping movement of the piston 16.

It will be readily understood that through this assembly the movement of the piston 16 is very speedy as long as oil may enter the cylinder 6 in large amounts through the sleeve 11 and that it is, in contradistinction, very slow as soon as the ball 12 has engaged its seat 11a. The oil can, in fact, pass then only through the passageway 15, the cross-section of which is much smaller than that of the opening formed in the sleeve 11.

The axial movement of the piston 16 is transmitted to the spindle 3 by a projection 18a of hard metal rigid with the rod 18 of said piston and acting on a ball 22 engaged laterally inside a cage 22 rigid with the spindle 3 and resting on a small element of hard metal, 21a. The high speed stage of the movement described corresponds to a movement of the cutting or drilling tool, which is not illustrated, towards the work to be machined, whereas the comparatively low stage corresponds to the actual machining.

The spindle 3 is fitted in a rotary sleeve 23 revolvably carried in a stationary outer sleeve 24 rigid with a support 25 rigidly secured to the casing 2. Said sleeve 24 carries superposed ball bearings 26 and 27 of which the outer race is driven by a pulley 28 surrounding said sleeve. Said pulley is controlled by a belt 28a extending through a slot 2a formed in the casing 2 and driven by a motor which is not illustrated.

The rotary movement of said pulley is transmitted to the sleeve 23 through a coupling constituted by a disc 29 rigid with said sleeve and by rods 30 secured to said disc and of which the ends engage corresponding ports 28b formed in the pulley and inside which said rods slide axially. A spring 31 urges said spindle 3 into the position illustrated in the drawing as long as the piston 16 has not begun its axial movement and it urges said spindle back into said same position when the piston 16 has finished executing its stroke. 32 designates a nozzle for the lubricant, opening into the space extending between the sleeve 23 and the outer sleeve 24 through a channel 32a formed in the lower end of the support 25.

The tool to be driven in rotation is secured coaxially on the headstock illustrated by means of a clamping device including elastic jaws 33 rigid with the end of the spindle 3.

Figure 2:
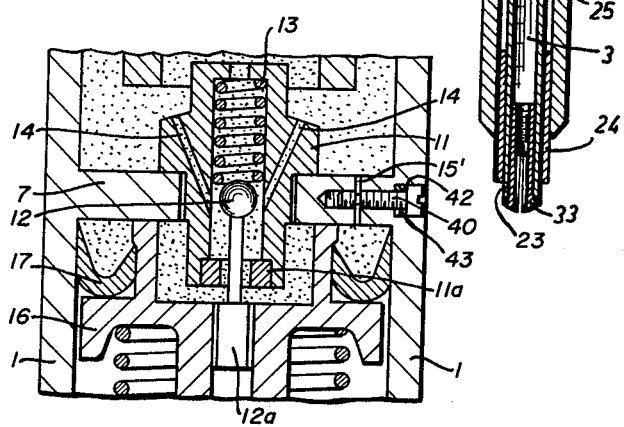
FIG. 2 is an enlarged cross-section showing a modification.

The speed of the slow movement of said spindle may, in accordance with a modification shown in FIG. 2, be adjusted from the outside of the headstock by acting on a screw 40 of which the stem is fitted in a threaded opening 4 formed edgewise in the partition 7 and the head of which is adapted to slide inside a recess 42 coaxial with last-mentioned opening and formed across the joint between the sleeves 11 and 2. Said opening 41 terminates with the passageway 15' corresponding to the passageway 15 of FIG. 1.

The screwing down of the screw 40 to a varying extent allows thus closing to an adjustable extent said passageway 15 and thereby the throughput of oil. Of course, the screw 40 is fitted in its recess 42 in a fluidtight manner as provided by the packing 43.

Obviously, my invention is not limited to the embodiment disclosed and illustrated by way of example and it covers all the modifications thereof falling within the scope of the accompanying claims. In particular, although the control arrangement has been described only with reference to its application to a machine-tool headstock, it may be used for controlling any axial rotary movement of any part in a machine or mechanism through an intermediate crank and connecting rod system.

What I claim is:
1. Arrangement for controlling the movement of a machine part comprising a first and second cylinder separated by a partition having an opening and an attenuated passage connecting said cylinders, a first piston movable axially in said first cylinder and dividing said first cylinder into a first chamber between said piston and said partition and a second chamber at the opposite end of said piston, a second piston movable axially in said second cylinder and defining a third chamber between said second piston and said partition, means biasing said second piston toward said partition, a rotatable working spindle carried by said second piston and extending in a direction away from said partition, valve means for closing said opening in said partition, means biasing said valve means to closed position, means carried by said second piston and engaging said valve means to hold said valve means open when said second piston is within a selected distance from said partition, said second and third chambers being filled with liquid, means for admitting pressure fluid to said first chamber to move said first piston toward said partition and thereby force said liquid through said opening and passage from said second chamber into said third chamber to move said second piston against said first mentioned biasing means away from said partition until said means for holding said valve means open is disengaged from said valve means to close said opening, whereupon said liquid flows through only said attenuated passage to move said second piston in the same direction at a slower rate.

2. Arrangement according to claim 1, in which means is provided for variably limiting movement of said second piston and spindle in a direction away from said partition.

3. Arrangement according to claim 2, in which said second piston is provided with a piston rod and in which a sleeve in an end of said second cylinder opposite said partition receives and guides said piston rod and is adjustable in an axial direction, an end of said sleeve being engageable by said second piston to limit axial movement of said second piston.

4. Arrangement according to claim 1, in which said valve means comprises a sleeve fitted in said partition and provided with a valve seat facing said first cylinder, a valve member adapted to seat on said valve seat to close said valve, spring means biasing said valve member toward said seat and a valve stem rigid with said valve member and extending through said sleeve, said valve stem being engageable with said means carried by said second piston to hold said valve member off of said seat until said second piston has moved a selected distance away from said partition.

5. Arrangement according to claim 1, in which means is provided for variably regulating the flow of liquid through said attenuated passage.

References Cited by the Examiner
UNITED STATES PATENTS

| | | | |
|---|---|---|---|
| 1,828,517 | 10/31 | White | 251—35 |
| 1,878,001 | 9/32 | Sloan | 251—35 |
| 2,892,313 | 6/59 | Hansberg | 60—54.5 |

FOREIGN PATENTS

| | | |
|---|---|---|
| 929,959 | 7/47 | France. |

JULIUS E. WEST, *Primary Examiner.*
ROBERT R. BUNEVICH, *Examiner.*